United States Patent [19]

Thomas

[11] Patent Number: 5,137,450
[45] Date of Patent: Aug. 11, 1992

[54] DISPLAY FOR ADVANCED RESEARCH AND TRAINING (DART) FOR USE IN A FLIGHT SIMULATOR AND THE LIKE

[75] Inventor: Melvin L. Thomas, Phoenix, Ariz.

[73] Assignee: The United States of America as represented by the Secretry of the Air Force, Washington, D.C.

[21] Appl. No.: 609,295

[22] Filed: Nov. 5, 1990

[51] Int. Cl.$^5$ .................. G09B 9/08; G09B 19/16
[52] U.S. Cl. .................. 434/44; 434/38; 273/434; 358/104
[58] Field of Search .............. 434/23, 24, 29, 30, 434/35, 38, 43, 44, 219, 220, 322, 336, 350, 365, 372; 273/434, 85 G, DIG. 28; 358/93, 104, 229, 241, 254; 364/578

[56] References Cited

U.S. PATENT DOCUMENTS

| | | |
|---|---|---|
| 3,514,871 | 6/1970 | Tucker . |
| 3,650,045 | 3/1972 | Wood et al. . |
| 3,785,715 | 1/1974 | Mecklenborg .................. 358/104 X |
| 3,895,861 | 7/1975 | Herndon .................. 352/69 |
| 4,028,725 | 6/1977 | Lewis .................. 358/103 |
| 4,103,435 | 8/1978 | Herndon .................. 434/43 |
| 4,347,507 | 8/1982 | Spooner .................. 434/44 X |
| 4,391,495 | 7/1983 | Mazurkewitz .................. 350/452 |
| 4,473,355 | 9/1984 | Pongratz .................. 434/44 |
| 4,640,266 | 2/1987 | Levy .................. 128/25 A |
| 4,740,073 | 4/1988 | Meacham .................. 352/58 |
| 5,023,725 | 6/1991 | McCutcheon .................. 358/93 X |

FOREIGN PATENT DOCUMENTS

1367993  1/1988  U.S.S.R. .................. 273/DIG. 28

OTHER PUBLICATIONS

Internal Training Equip. Conference & Exhib. Proc. Apr. 9-11, 1990 National Exhibit Cent. Birmingham England Melvin L. Thomas.
Crystal Eyes, Stereoscopic System, For Computer Graphics & Video, Mar. 19, 1990.

*Primary Examiner*—Richard J. Apley
*Assistant Examiner*—Joe H. Cheng
*Attorney, Agent, or Firm*—Fredric L. Sinder; Donald J. Singer

[57] ABSTRACT

A wrap-around display system for presenting out-the-window visual imagery in a flight simulator is disclosed. Eight identically pentagon-shaped translucent rear-projection screens are joined together at their edges to form a partial dodecahedron. Each video projector is mounted outside the partial dodecahedron to direct, through a mounted mirror-folded beam path, an appropriate simulator image to the rear of a pentagon screen. A simulator pilot views the simulated image from inside the partial dodecahedron. Also disclosed is an apparatus for switching eight video signals among six video channels by monitoring simulator head movement to switch video signals to the screen, or window, then being viewed. Further disclosed is an apparatus for providing geometrically correct separate images to two simulator crewmembers. Each field of an interlaced raster display is a display for a separate crewmember design eyepoint. Two liquid crystal controlled glasses are worn one each by each crewmember. The glasses lens are separately switched on and off in synchronization with the two video fields so that each crewmember sees the geometrically correct view for his or her design eyepoint.

5 Claims, 6 Drawing Sheets

DISPLAY FOR ADVANCED RESEARCH AND TRAINING (DART) FOR USE IN A FLIGHT SIMULATOR AND THE LIKE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to flight simulators, and more particularly to an improvement in wrap-around display systems for presenting out-the-window visual imagery in a flight simulator.

A critical requirement for realistic flight simulation is that the video display provide a complete field-of-regard (the range of views available to a pilot from an aircraft cockpit by moving about his or her head). Other important requirements include a wide instantaneous field-of-view (the range of views available to a pilot at any instant while holding still his or her head), high contrast and high resolution. All of these requirements should be obtained, of course, with a compact structure and at low cost.

The prior art has provided wide field-of-regard and wide field-of-view display systems generally by the use of large domes (12 to 20 feet in radius) with multiple video projectors mounted inside the dome. The large radius has been considered necessary to provide a so-called infinity display in which the light from the virtual image to the eyes of a flight simulator pilot was collimated so that it would appear to be focused at infinity. It has been believed that an infinity display is necessary for the image to appear sufficiently real to the simulator pilot to make a successful simulation. In addition to their high cost, these large dome systems suffer from an inherent problem in positioning the projectors. The ideal location for both the projectors and the design eye-point (the point inside the simulator where the simulator pilot's eyes are expected to be located) is the center of the dome. Moving the projectors from this ideal location forces undesirable compromises on display brightness and illumination evenness. It is also very difficult to position the projectors and their associated correction optics to provide a sufficient field-of-regard approximating that of a modern fighter aircraft. Another critical problem with such dome display systems is that the internally reflective domes are spherical integrators in that the projected light makes multiple bounces inside the dome resulting in a high level of ambient illumination. This markedly reduces the resulting contrast ratio in the originally projected screen, typically resulting in contrast ratios less than 10:1.

A modification of such prior art dome systems is described in U.S. Pat. No. 4,473,355 to Pongratz. The Pongratz patent describes a dome display in which a plurality of rear projectors mounted outside a translucent dome project the image back toward the dome. The inside of the dome is covered with a Fresnel lens system in which a plurality of Fresnel lens each have their optical axis directed toward the cockpit inside the dome so that an infinity display is provided.

Another approach is described in U.S. Pat. No. 3,514,871 to Tucker. The Tucker patent describes a wrap-around visual display system made with three horizontally arranged, rectangular rear-projection screens positioned at angles to each other to roughly wrap-around the front of the simulator pilot. The screens are spaced five or more feet from the simulator pilot. Three large convex lens are positioned one each in-between the simulator pilot and the rear-projection screens. The lens are to give the simulator pilot the impression that the virtual images are focused at infinity.

A further approach for making an infinity display is described in U.S. Pat. No. 4,391,495 to Mazurkewitz. The Mazurkewitz patent describes a screen comprising a plurality of Fresnel lens positioned in-between the eyes of a viewer and a cathode ray tube (CRT) display. The Fresnel lens arrangement has a large exit pupil so that the viewer has more freedom of head movement (typically side-to-side) before the visually corrected image is lost. The Mazurkewitz patent also suggests making a simulator display system of pentagon shaped screens, each made according to the teachings of the Mazurkewitz patent, connected together at their edges to make a 12-sided dodecahedron surrounding the viewer.

The Pongratz, Tucker and Mazurkewitz patents each have as a primary object making a more compact simulator display system while still providing an infinity display. To achieve this infinity display effect, they must each compromise various combinations of wide field-of-regard, wide field-of-view, resolution, brightness, contrast and low cost.

A more recently developed display system for flight simulators is the Fiber Optic Helmet Mounted Display (FOHMD) developed by CAE Electronics in Montreal, Canada. This display has excellent brightness, contrast and resolution, but is nearly as expensive as a dome and cannot deliver a wide instantaneous field-of-view. It also requires an extensive set of optics mounted on a custom helmet which detracts from the simulator pilot's ability to make natural head motions. The helmet optics also act as dark sunglasses, allowing only about ten to twenty percent of the ambient light to filter through, thus making it very difficult to provide sufficient cockpit illumination for instrument viewing and map reading.

Thus it is seen that there is a nee for a compact visual display system for flight simulators that combines compactness with wide field-of-regard, wide field-of-view, resolution, brightness, contrast and low cost.

It is, therefore, a principal object of the present invention to provide a compact, cost effective, out-the-window visual display system for flight simulators that has a wide field-of-regard, wide field-of-view, reasonable resolution, and high brightness and contrast.

It is another object of the present invention to provide a display system for flight simulators that can display separate geometrically correct displays for each of a pair of simulator crewmembers sitting in different positions inside a flight simulator.

It is a feature of the present invention that it can simulate a multi-channel display of more video channel signals than are actually continuously available in the system.

It is an advantage of the present invention that it is very cost effective and straightforward to manufacture because it is made largely with relatively low-cost, off-the-shelf components.

These and other objects, features and advantages of the present invention will become apparent as the description of certain representative embodiments proceeds.

SUMMARY OF THE INVENTION

The present invention provides a compact, cost effective, out-the-window visual display system for flight simulators that has a wide field-of-regard, wide field-of-view, good resolution, high brightness and excellent contrast. The unique discovery of the present invention is that an infinity display is not needed to provide a successful impression of a three dimensional volume to a flight simulator pilot. The high costs and inconvenience associated with large domes or complicated optics can be avoid with little or no loss of simulator usefulness simply by placing the display screens at about 3.5 feet from the design eye-point of the simulator. Another discovery is that simple flat screens in uniform pentagonal shapes are also easily accepted as representative images, or virtual windows, and can be joined at their edges into a wrap-around dodecahedron shape. A further discovery is that the edge connectors or joints between pentagon windows or screens can include 1 cm dark separations with no distraction.

Accordingly, the present invention is directed to a compact visual display system for use as part of a vehicle simulator operated by a simulator pilot, comprising a plurality of flat rear-projection screens, each screen having the shape of a pentagon, the screens being joined along their edges to make a partial enclosure having the outside shape of a partial dodecahedron and each rear-projection screen being spaced from a design eye-point for the intended simulator pilot at a distance of less than about 3.5 feet; and, a plurality of video Projectors for projecting beams of video images, each projector mounted outside the partial dodecahedron enclosure and aimed to project its video beam toward a rear-projection screen. The visual display system may include a plurality of mirrors positioned one each in-between each projector and a corresponding rear-projection screen wherein the video beam path for each video projector to a rear-projection screen will be folded so that the video projectors screens can be positioned closer to the partial dodecahedron enclosure than otherwise. The visual display system may also include means for generating a plurality of video images for transmitting to the video projectors, one video image for one projector, the video image generating means including means for transmitting video images over video channels to the video projectors, wherein there are fewer video channels than video images; means for determining head position of the intended simulator pilot; and, means for switching transmission of video images among available video channels according to the determined head position of the intended simulator pilot. The visual display system may further include means for generating video images simulating a view about the simulator vehicle from the design eye-point, wherein the video image generating means further includes means for generating alternating video images simulating views about the simulator vehicle from the design eye-point of an intended simulator pilot positioned at correspondingly alternating positions inside the partial dodecahedron enclosure; means for producing an interlaced video signal comprising alternating interlaced video frames, each pair of alternating frames making a video field, for transmitting to a video projector, wherein each alternating field displays a corresponding alternating video image from the video image generating means; and, eyewear means for wear by an intended simulator pilot, wherein the eyewear means include means for rapidly switching transmission through the eyewear means on and off in synchronization with one of the alternating fields so that that intended simulator pilot will see only one of the alternating generated video images simulating views about the simulator vehicle from alternating design eye-points. The visual display system may also include means for generating a plurality of video images for transmitting to the video projectors, one video image for one projector, wherein one of the video images includes an image of a heads-up display.

DESCRIPTION OF THE DRAWINGS

The present invention will be more clearly understood from a reading of the following detailed description in conjunction with the accompanying drawings wherein.

DETAILED DESCRIPTION

Figure 1:
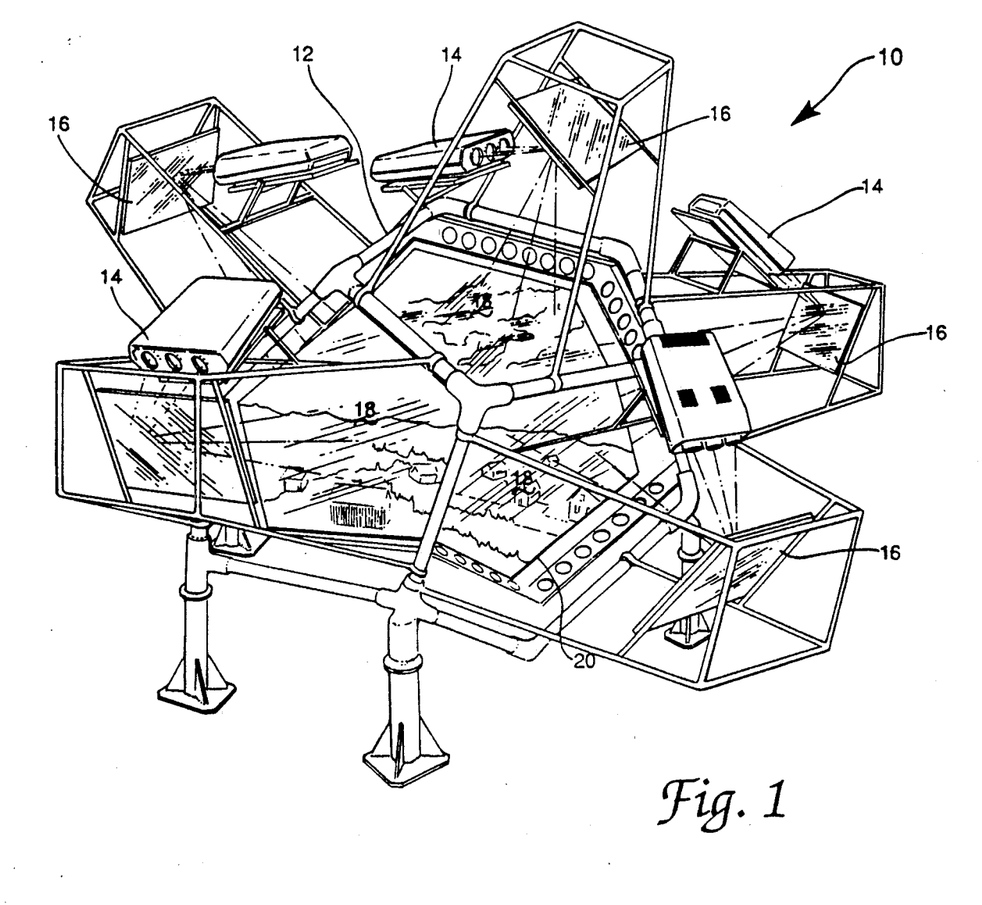
FIG. 1 is a perspective view of the outside of a visual display system made according to the teachings of the present invention showing its video projectors projecting video images onto the backs of its rear-projection pentagon screens (with incidental back reflections) joined together in the shape of a partial dodecahedron.

Referring now to FIG. 1 of the drawings, there is shown a perspective view of the outside of a simulator visual display system 10. Mounted onto a supporting frame 12 are eight video projectors 14 and eight corresponding mirrors 16 (three each of the video projectors and mirrors are hidden in this view) which reflect (or fold) the video beams projected from each video projector 14 to the rear of corresponding translucent rear-projection screens, or windows, 18. Each rear-projection screen 18 is in the shape of a pentagon. Screens 18 are joined along their edges to form the shape of a partial dodecahedron 20.

Figure 2:
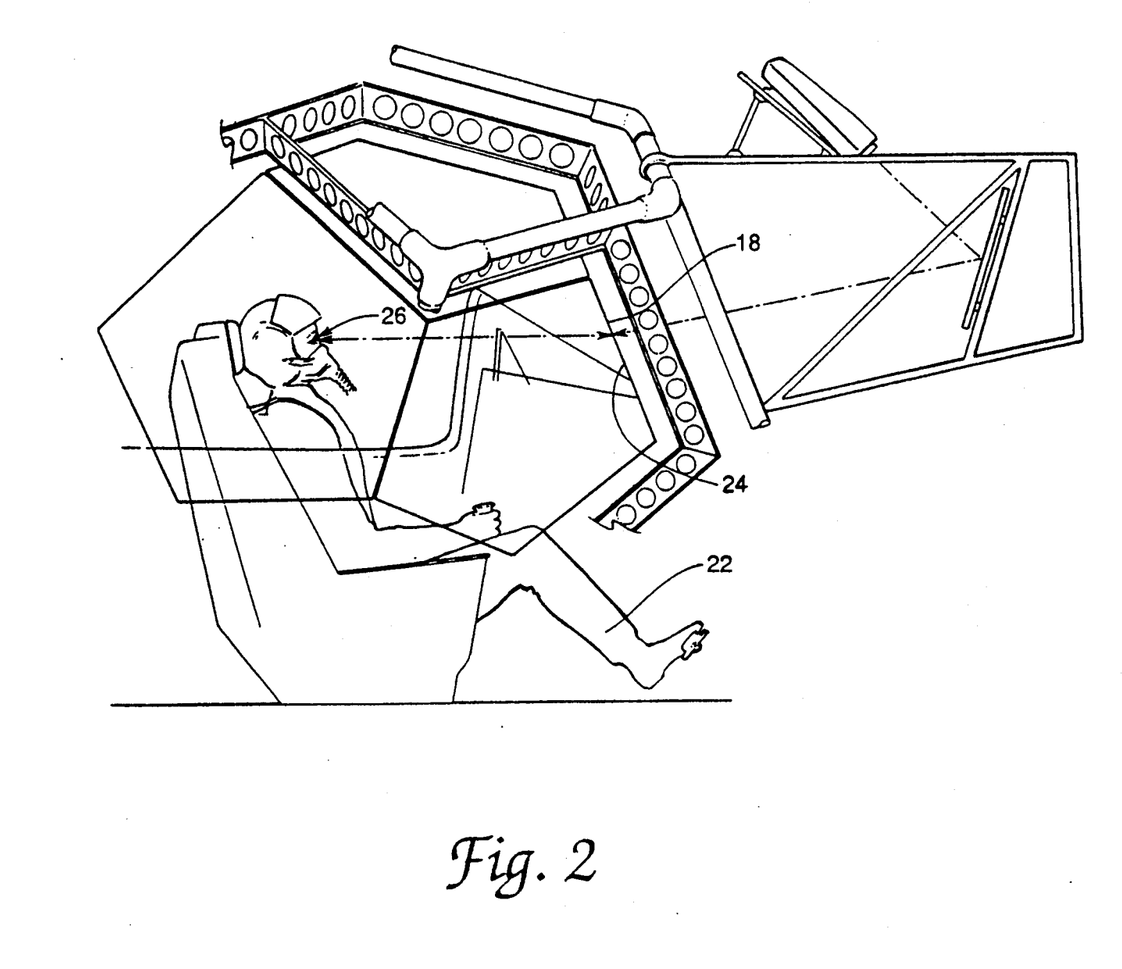
FIG. 2 is a perspective cutaway side view of a visual display system made according to the teachings of the present invention showing a simulator pilot viewing the rear-projected image on one of the pentagon screens.

FIG. 2 is a perspective cutaway side view of visual display system 10 showing a simulator pilot 22 viewing a rear-projected image 24 on one of the pentagon screens 18. The distance from the design eye-point 26 to the screen image 24 is about 3.5 feet. About one meter is probably the minimum separation distance that will work successfully in tactical simulation. At what distance the image will no longer be accepted as real by a simulator pilot is probably less, but one meter is a reasonable minimum because the eye requires approximately one diopter of accommodation at this distance which the population under 55 years old can comfortably accommodate.

Figure 3:
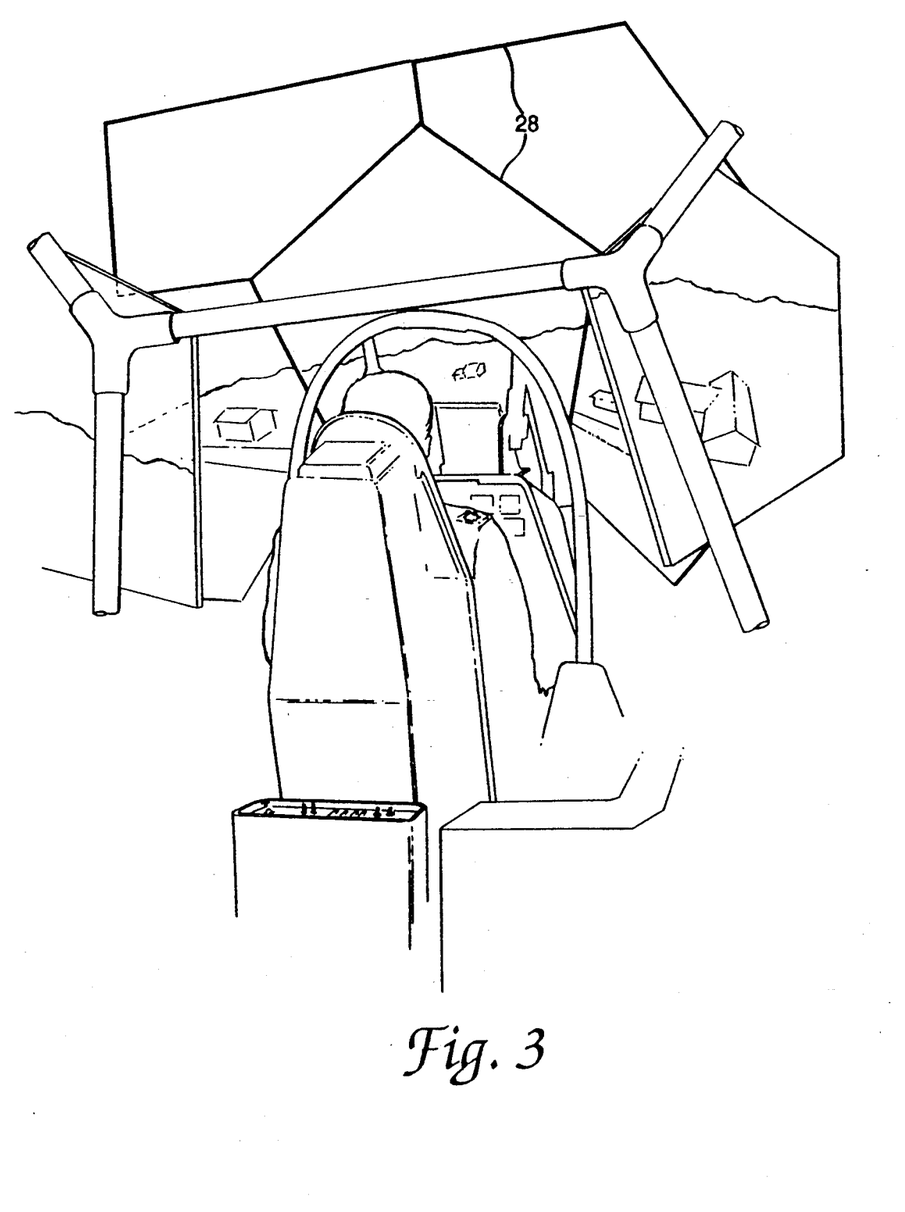
FIG. 3 is a perspective rear view of the inside of a visual display system made according to the teachings of the present inventions showing the position and view of a simulator pilot in relation to the display.

FIG. 3 is a perspective rear view of the inside of visual display system 10 showing the view seen by simulator pilot 22. Frame sections, or joints, 28 are painted black and are about 1 cm wide. The separation is readily accepted by simulator pilots and is no more distracting than the frame elements of a real cockpit transparency.

In a first successful construction of the present invention, Barcodata Model 600 projectors were used, giving a display resolution of 4.75 arcminutes/pixel when driven with a raster image of 1000 lines at 1000 pixels per line. The brightness has been measured at 7 footlamberts and the contrast ratio at 50:1. The translucent screens (LUMIGLAS Model 130) have a net gain of one, but higher gain screens could be used to increase display brightness. The mirrors were ordinary frontsilvered department store-type surveillance mirrors, having about a 50% efficiency. In a later version of the present invention, more expensive, much higher efficiency mirrors were used with a corresponding increase in brightness.

The described embodiment was build around an already existing Advanced Simulator in Undergraduate Pilot Training Program (ASUPT) support frame. A custom frame design, and shorter throw optics, could allow the overall diameter to be reduced to 6.1 meters (20 feet) or less.

Figure 4:
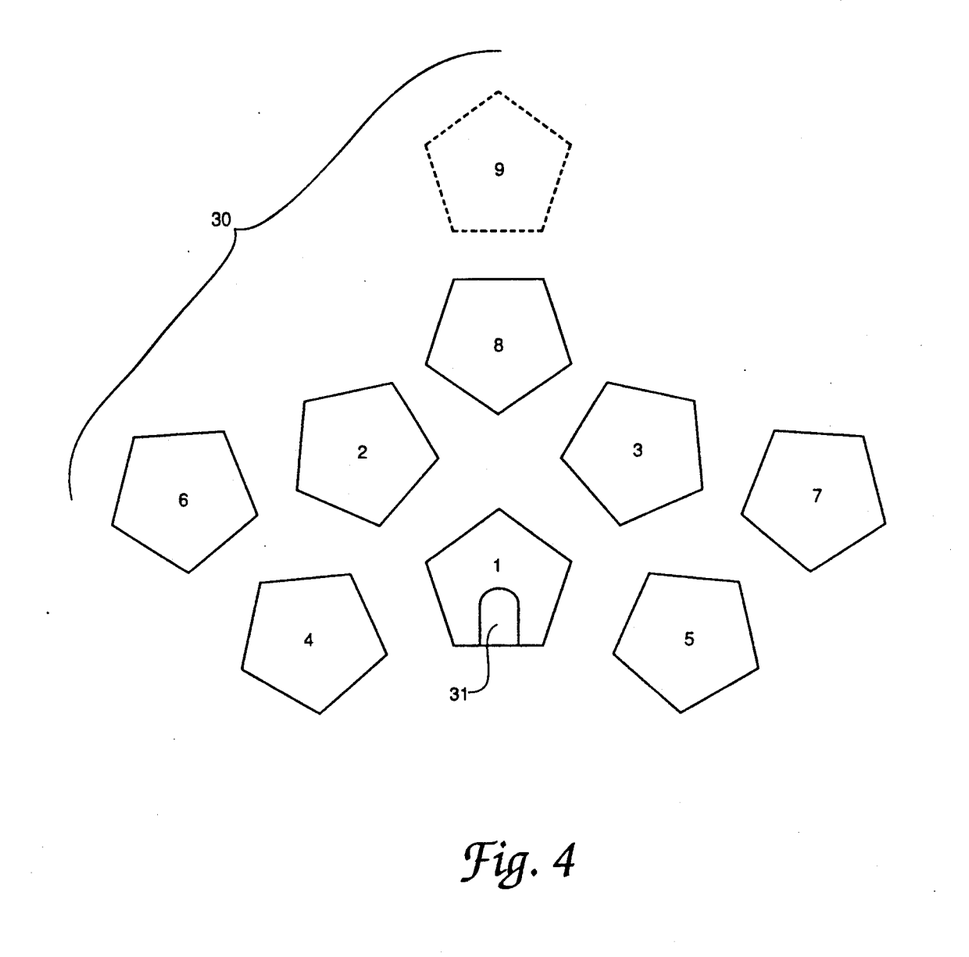
FIG. 4 is an exploded view of an imagery mosaic according to the present invention showing a nine screen view.

FIG. 4 is an exploded view of an imagery mosaic 30 showing nine window views. Window 1 is a directly ahead view, window 8 a directly overhead view and windows 2–7 side and side-behind views. Window 9, shown in dashed outline, is a rear view, or so-called "check six" view, which would be needed to provide a fully complete field-of-regard. The discussed actual construction of the present invention does not have a "check six" pentagon to allow for cockpit ingress/egress. Window 1 includes a simulated heads-up display to complete the simulation for a typical tactical fighter.

Figure 5:
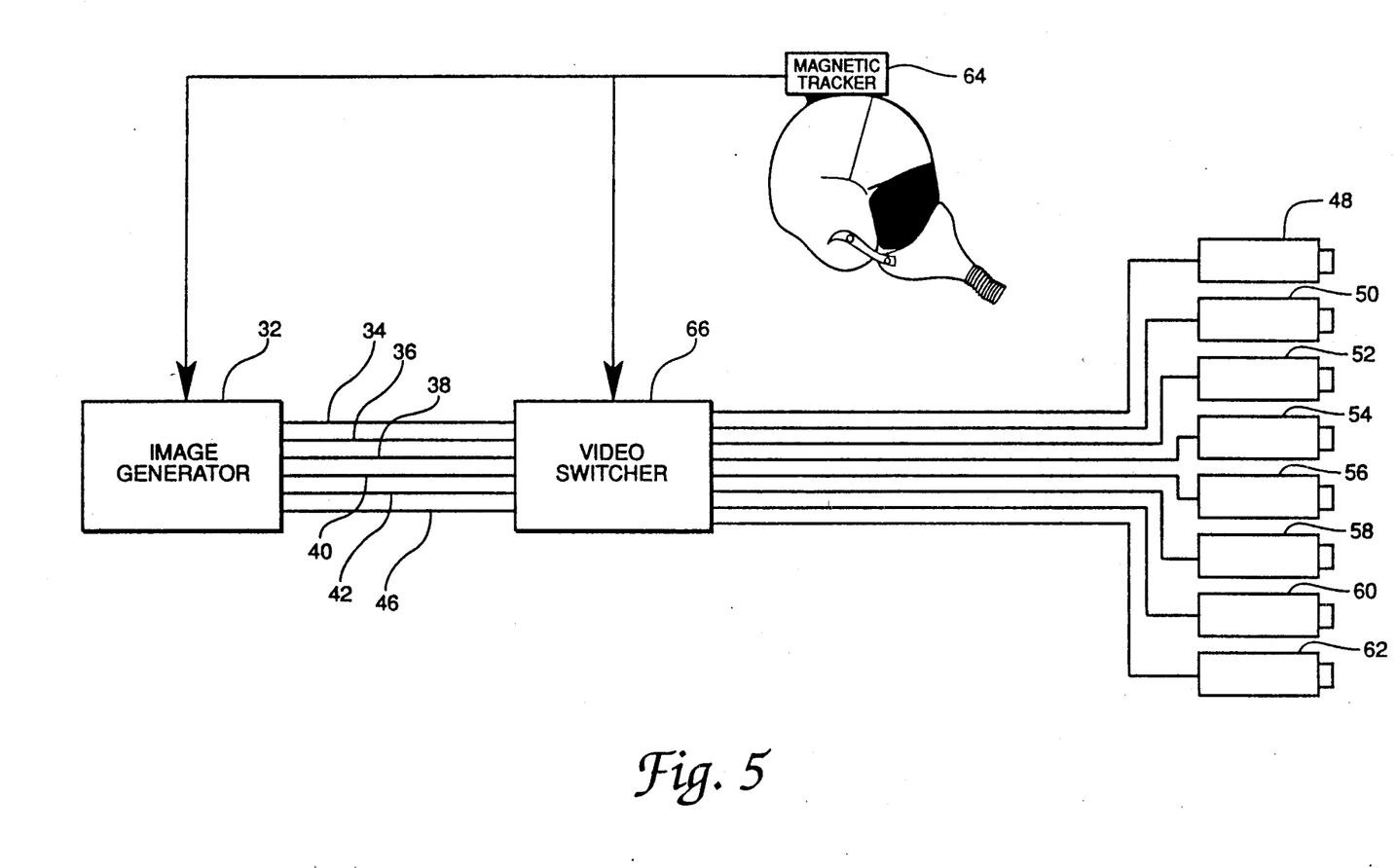
FIG. 5 is a simplified block diagram of the elements of an example embodiment of the present invention showing means for switching eight video images among six available video channels; and, FIG. 6 is a simplified block diagram of the elements of an example embodiment of the present invention showing means for showing geometrically correct images to each of two simulator crewmembers.

FIG. 5 is a simplified block diagram of the elements of an example embodiment of the present invention showing means for switching eight video images among six available video channels. An image generator 32 can generate eight different video images, but can only transmit at one time six channels 34–46 of video signals. Each video image is intended to be projected by one corresponding video projector 48–62 onto a corresponding video window. A helmet-mounted magnetic tracker, or position indicator, 64 enables image generator 32 and associated circuitry to switch two or more pairs of video image signals between one signal channel so that, in combination with a video switcher 66, the appropriately transmitted image may be switched between, for example, window pair 4 and 8 and also between window pair 6 and 7, as shown in FIG. 4, according to where the simulator pilot's head and eyes are pointing at that moment. This system, by reducing the number of windows having a projected image at any one time, increases overall system contrast. In practice, because only two video channels are generally being switched among four projectors, video switcher 66 needs only two inputs and four outputs (or a functionally equivalent pair of single input-dual output video switchers), which reduces the cost and complexity of the overall system. The image generator used in a constructed version of the present invention, comprising both hardware and software, has been a prototype version of COMPUSCENE IV, an image generation system available from General Electric Company, Simulation and Control Systems Department, in Daytona Beach, Fla. This image generation system is a high end system with photographic textured imagery, which helped create the successful acceptance by simulator pilots and other users. Similar image generation systems are well-known in the art and available from a number of sources.

Figure 6:
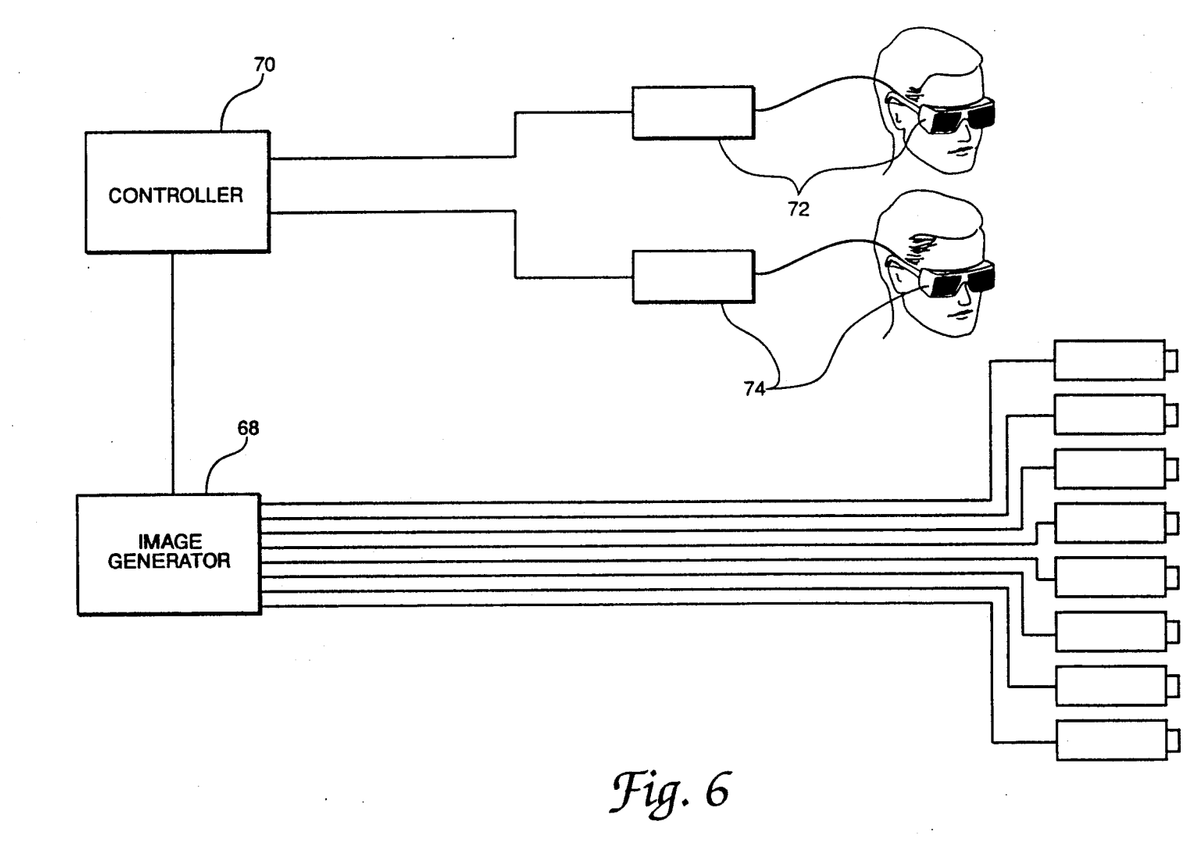

FIG. 6 is a simplified block diagram of the elements of an example embodiment of the present invention showing means for showing geometrically correct images to each of two simulator crewmembers. An image generator 68 can generate eight different video images, each image being the appropriate view out a particular window for a predetermined design eye-point. Image generator 68 can also generate eight similar video images, but for a different predetermined design eye-point. In a conventional video raster display of a video image, only every other raster line is transmitted with each so-called field, so that a full so-called frame comprises two successively transmitted fields. The alternating fields, which make up the so-called interlaced video display, are alternately transmitted rapidly enough so that the display is viewed as normal by the human eye without flicker. In the FIG. 6 embodiment, each field is the video image for a different design eye-point and is generated by image generator 68. Each of two simulator crewmembers, sitting, for example, side-by-side in a slightly larger radius or elliptically shaped simulator enclosure, wear glasses 72 and 74 that rapidly switch on and off in synchronization with each of the two separate fields so that each crewmember sees only the geometrically correct view intended for his or her design eye-point. A computer or controller 70 controls either or both of image generator 68 and glasses 72 and 74 to synchronized the images and glasses. The CRYSTALEYES brand stereoscopic system, available from Stereographics Corporation in San Rafael, Calif., includes eyewear with liquid crystal controlled lens. The CRYSTALEYES eyewear is intended to alternately switch left and right eye lens on and off in synchronization with different fields displaying right and left eye views so that a stereoscopic effect is achieved. To sue with the FIG. 6 embodiment, two pairs of CRYSTALEYES eyewear can be easily modified so that both lens of each pair of glasses 72 and 74 turn on and off together.

The disclosed wrap-around display system for presenting out-the-window visual imagery in a flight simulator successfully demonstrates the use of a plurality of rear-projection screens mounted concentric around and close to the design eye-point of the simulator without complicated optics for simulating an infinity view. Although the disclosed system is specialized, its teachings will find application other areas where expensive apparatus to exactly mimic some natural phenomenon may be, in fact, unnecessary in view of the brain's ability to understand an representative virtual view.

It will be seen by those with skill in the field of the invention that the system as shown may be assembled in a variety of other ways, and the video projectors arranged in other configurations. For example, a more recent construction is configured so that different cockpits may be wheeled in and out from the rear or the partial dodecahedron. Other modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

I claim:

1. A compact visual display system for use as part of a vehicle simulator operated by an intended simulator pilot having a design eye-point, comprising:

(a) a plurality of flat rear-projections screens, wherein each screen has the shape of a pentagon, wherein the screens are joined along their edges to make a partial enclosure having the outside shape of a partial dodecahedron, and wherein each rear-projection screen is positioned less than about 3.5 feet across an optically unmodified space from a design eye-point for the intended simulator pilot; and, (b) a plurality of video projections for projecting beams of video images, each projector mounted outside the partial dodecahedron enclosure and aimed to project its video beam toward a rear-projection screen.

2. The compact visual display system according to claim 1, further comprising a plurality of mirrors positioned one each between each projector and a corresponding rear-projection screen, wherein the video beam path for each video projector to a rear-projection screen will be folded so that the video projectors can be positioned closer to the partial dodecahedron enclosure than otherwise.

3. The compact visual display system according to claim 1, further comprising:

(a) means for generating a plurality of video images for transmitting to the video projectors, one video image for one projector, the video image generating means including means for transmitting video images over video channels to the video projectors, wherein there are fewer video channels than video images;

(b) means for determining head position of the intended simulator pilot; and, (c) means for switching transmission of video images among available video channels according to the determined head position of the intended simulator pilot.

4. The compact visual display system according to claim 1, further comprising:

(a) means for generating video images simulating a view about the simulator vehicle form said design eye-point, wherein the video image generating means further includes means for generating alternating video images simulating views about the simulator vehicle from the design eye-point of an intended simulator pilot positioned at correspondingly alternating positions inside the partial dodecahedron enclosure, and wherein the video image generating means further includes means for producing an interlaced video signal comprising alternating interlaced video fields, each pair of alternating fields maiking a video frame, for transmitting to a video projector, wherein each alternating field displays a corresponding alternating video image from the video image generating means;

(b) eyewear means for wear by an intended simulator pilot, wherein the eyewear means include means for rapidly switching transmission through the eyewear means on and off; and, (c) means for controlling at least one of the video image generating means and the eyewear means to synchronize the eyewear means with one of the alternating fields so that the intended simulator pilot will see only one of the alternating generated video images simulating views about the simulator vehicle form alternating design eye-points.

5. The compact visual display system according to claim 1, further comprising means for generating a plurality of video images for transmitting to the video projectors, one video image for one projector, wherein one of the video images includes an image of a heads-up display.

* * * * *